July 9, 1968 J. HALLER 3,391,444
EXTRUSION METHOD OF PRODUCING COATED SINTERED
POWDERED METAL ARTICLES
Filed Feb. 2, 1967 3 Sheets-Sheet 1
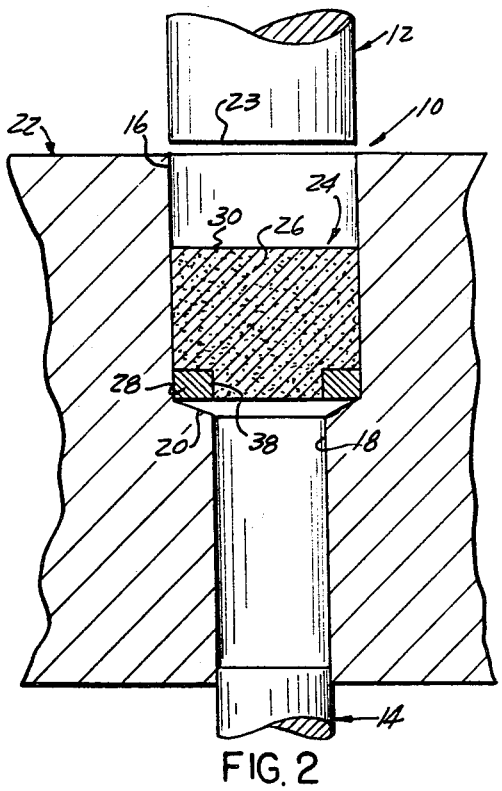
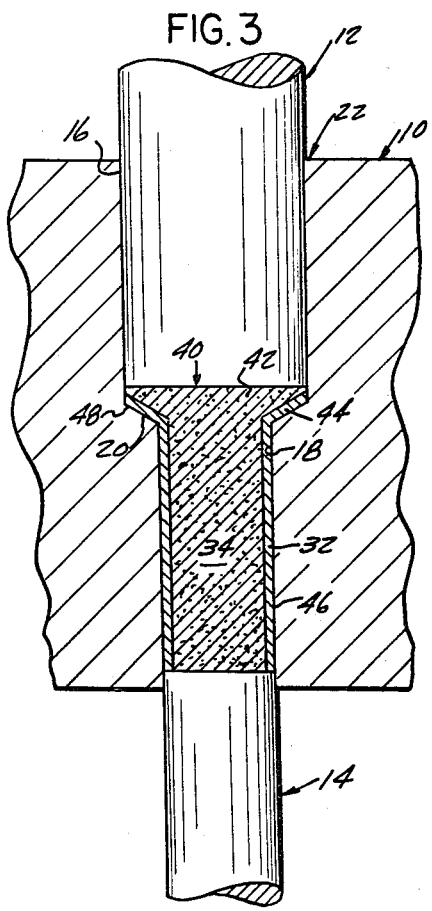
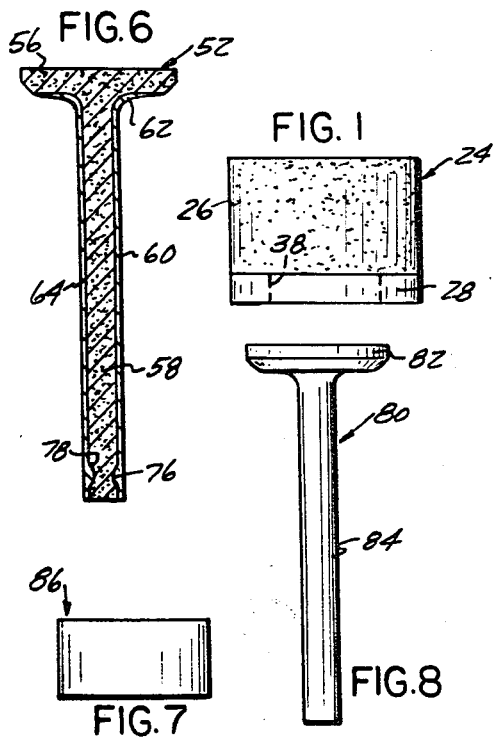
INVENTOR
JOHN HALLER
BY Barthel + Bugbee
ATTORNEYS

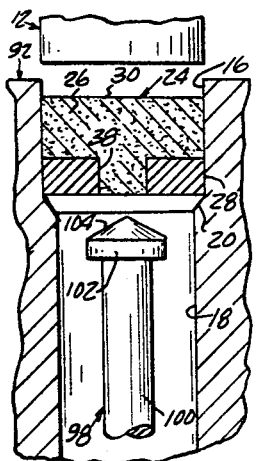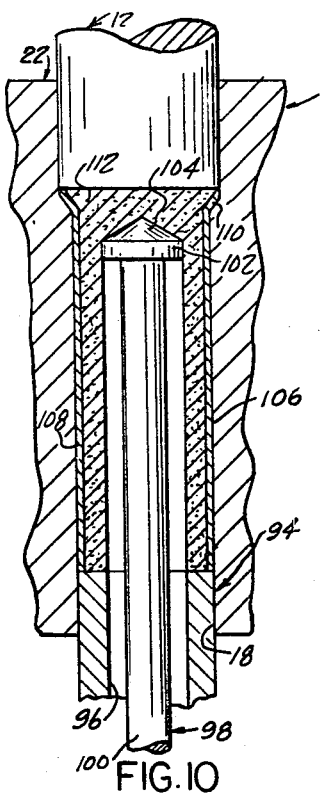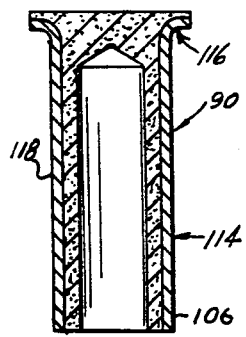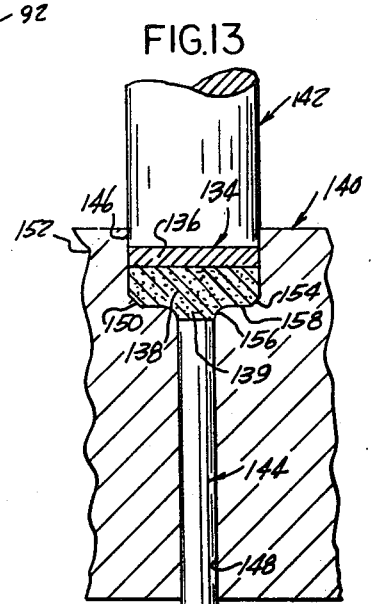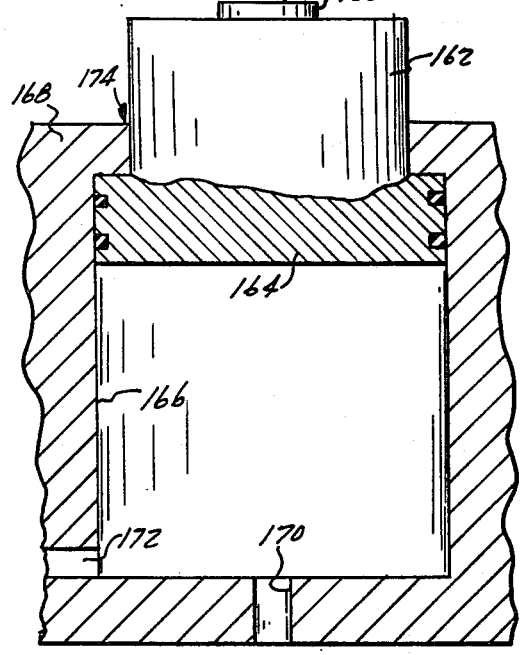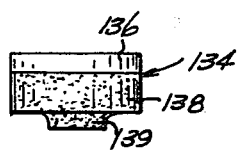
INVENTOR
JOHN HALLER
BY Barthel & Bugbee
ATTORNEYS

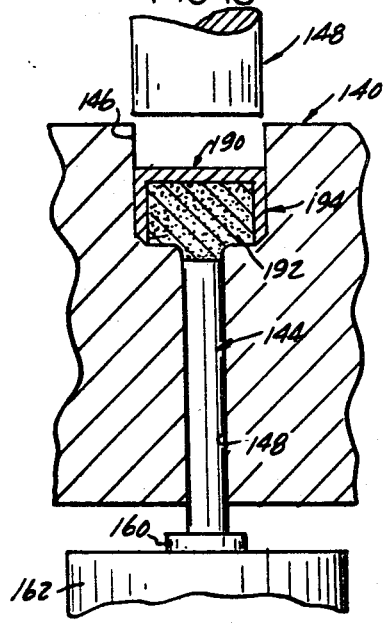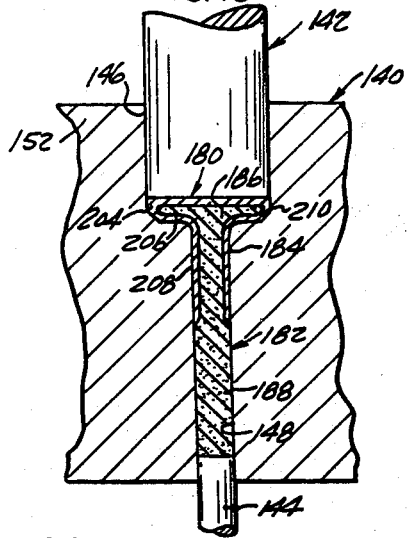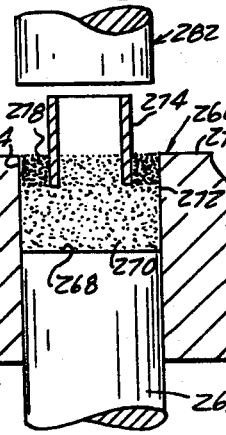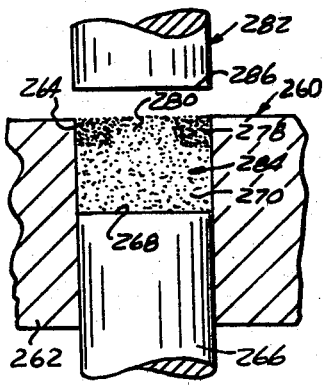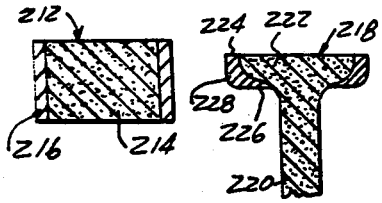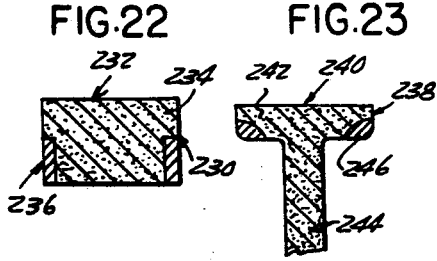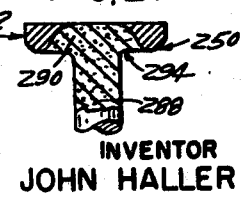

United States Patent Office 3,391,444
Patented July 9, 1968

3,391,444
EXTRUSION METHOD OF PRODUCING COATED
SINTERED POWDERED METAL ARTICLES
John Haller, Northville, Mich., assignor to Federal-Mogul
Corporation, Detroit, Mich., a corporation of Michigan
Filed Feb. 2, 1967, Ser. No. 613,525
16 Claims. (Cl. 29—420.5)

ABSTRACT OF THE DISCLOSURE

This method produces a body of sintered powdered metal, such as powdered iron or steel, coated with a layer of dissimilar metal, such as bronze, aluminum or stainless steel, by first producing a composite slug of sintered powdered metal with which is combined a sintered powdered annulus or disc of the coating metal. After being heated to a high temperature, the composite slug is extruded through an opening of smaller diameter than the slug, whereupon the coating material flows along the outside of the extrusion while the sintered powdered metal flows along the inside thereof, thereby producing a coated headed article which is then ejected from the extrusion die. The article may thus be used if a head is required on it, or the head may be cut off to leave the coated body. The coating metal, if bronze, provides a bearing metal layer on the body.

Background of the invention

Previously, metal articles have been coated with dissimilar metals by electro-plating, by swaging, by spraying the body with the molten coating metal, by deposition of the coating metal in powder form, by dipping the body in a molten bath of the coating metal, and by electrostatically depositing the coating metal on the article in a vacuum. All of these methods require specialized or high-temperature-resistant apparatus for carrying them out.

Summary of the invention

The method summarized above in the Abstract of Disclosure has the advantage of employing extrusion apparatus and procedure in conjunction with powder metallurgy techniques. The method is carried out with great rapidity, provides a protective or bearing layer upon the exposed surface of the body metal, such as sintered powdered iron, which is otherwise subject to corrosion, to deterioration when exposed to high temperatures, or to inferior bearing performance. The method is particularly well adapted for producing a headed article, such as a valve tappet, and also, by removal of the head, for producing a bearing-coated pin, shaft or plunger. The term "powdered iron" as used herein will be understood to include powdered steel, which is a powdered iron with a carbon content.

In the drawing:
FIGURE 1 is a side elevation of a composite sintered powdered metal slug produced for the purpose of carrying out the extrusion step of the method shown in FIGURE 2;
FIGURE 2 is a diagrammatic sectional view, showing the first step in extruding the composite sintered powdered metal slug of FIGURE 1;
FIGURE 3 is a diagrammatic sectional view showing the relative positions of the parts at the conclusion of the extrusion of the composite sintered powdered metal slug of FIGURE 1;
FIGURE 4 is a central vertical section through the extruded article shown in FIGURE 3, after removal of the head, shown in dotted lines;

FIGURE 5 is a central vertical section through a composite sintered powdered metal slug produced similarly to FIGURE 1 but adapted to produce a headed article with a slender coated elongated stem;
FIGURE 6 is a central vertical section through the coated headed article produced by extrusion of the composite slug shown in FIGURE 5;
FIGURE 7 is a side elevation of a homogeneous slug used in the extrusion of the uncoated headed member of FIGURE 8;
FIGURE 8 is a side elevation of an uncoated extruded headed member;
FIGURE 9 is a view similar to FIGURE 2, at the start of extrusion, but showing a modification in which a coated hollow shaft is produced;
FIGURE 10 is a view similar to FIGURE 3 but of the FIGURE 9 modification;
FIGURE 11 is a central vertical section through the tubular headed shaft produced in FIGURES 9 and 10;
FIGURE 12 is a side elevation of a further modified composite sintered powdered metal slug for producing a top-protected headed member;
FIGURE 13 is a view similar to FIGURE 2, but showing the slug of FIGURE 12 at the start of extrusion;
FIGURE 14 is a view similar to FIGURE 3, but of the slug of FIGURE 12 at the end of extrusion;
FIGURE 15 is a central vertical section through the inner component of a cupped composite slug used in a still further modified process of the invention;
FIGURE 16 is a central vertical section through the outer component of the cupped composite slug of FIGURE 15;
FIGURE 17 is a central vertical section through the composite slug formed by combining the components of FIGURES 15 and 16;
FIGURE 18 is a view similar to FIGURE 2 but showing the start of extrusion of the composite slug of FIGURE 17 to produce a top-protected headed member;
FIGURE 19 is a view similar to FIGURE 18 but showing the appearance of the parts at the end of extrusion;
FIGURE 20 is a central vertical section through a further modified composite slug used for the extrusion of a rim-protected headed member, according to the invention;
FIGURE 21 is a fragmentary central vertical section through the rim-protected headed member extruded from the composite slug of FIGURE 20;
FIGURE 22 is a central vertical section through a modification of the composite slug of FIGURE 20 wherein only the under side of the rim of a headed member is protected;
FIGURE 23 is a fragmentary central vertical section through the under-rim protected member formed by extrusion of the composite slug of FIGURE 22;
FIGURE 24 is a diagrammatic central vertical section through a briquetting press showing the filling step in a further modified process of producing and combining both components of a composite briquette simultaneously;
FIGURE 25 shows the briquetting press of FIGURE 24 after the completion of filling and just prior to compressing the composite powdered metal charge;
FIGURE 26 is a central vertical section through the composite powdered metal slug produced after sintering the briquette formed in FIGURE 25; and
FIGURE 27 is a fragmentary central vertical section through a rim-protected headed workpiece produced by extrusion of the composite slug of FIGURE 26.

Referring to the drawings in detail, FIGURE 2 shows diagrammatically a conventional extrusion press 10 for carrying out one step of the method of the present invention. The press 10 has upper and lower punches or plungers 12 and 14 respectively reciprocable into and out of upper and lower bores 16 and 18 of different diameters joined to one another by a shouldered surface 20, which is preferably a beveled or frusto-conical surface, the respective bores and surfaces 16, 18 and 20 being contained with in a die block 22. The upper plunger 12 has a lower end 23. The lower punch or plunger 14 in this instance serves as an ejection or knockout plunger.

Prior to performing the extrusion step of the present method, a composite sintered powdered metal slug 24 is prepared by separately forming its rabbetted upper component 26 and lower annular component 28 by conventional methods from dissimilar powdered metals in conventional briquetting presses. The briquettes thus formed are sintered in conventional sintering ovens. The components 26 and 28 are then pressed together to form the composite sintered powdered metal slug 24. The upper component 26, for example, may be formed from a suitable core metal, such as powdered iron or carbon steel, and the lower component 28 from a suitable powdered coating metal, such as a bearing metal like bronze, or a corrosion-resisting metal, such as aluminum, or a high-temperature resisting metal, such as stainless steel.

The composite sintered powdered metal slug 24 in the present instance has the coating metal portion 28 located at the lower end of the core metal portion 26, in order that it will coat the exterior of that part of the resulting workpiece formed by the extrusion of the core metal portion 26, the lower part of which has an opening or hole 38.

Immediately prior to being subjected to extrusion, the composite slug 24 is heated to a suitably high extrusion temperature. For stainless steels, this lies between 1900° F. and 2250° F., whereas for bronze a temperature in the neighborhood of 1100° F. has been found suitable. This extrusion temperature must always be below the melting point of the metals involved in the composite slug 24. For example, bronze composed of 90 parts copper to 10 parts tin melts at 1841° F., and aluminum at 1220° F. Sintered powdered iron melts in the neighborhood of 2400° F.

The composite sintered powdered metal slug 24 is now dropped into the upper bore 16 of the extrusion die 22 of the extrusion press 10 (FIGURE 2). Pressure is then applied to the extrusion plunger 12 which snugly but slidably fits the bore 16 of the extrusion die 22 while the lower plunger or knockout plunger 14 is withdrawn to the lower end of the reduced diameter bore 18. As the extrusion plunger 12 descends and presses downward upon the top surface 30 of the slug 24, it pushes the latter downward, causing it to become deformed as it is forced against the frusto-conical surface 20 and into the reduced diameter lower bore 18. The material of the annular sintered powdered metal lower component 28 which is of lower melting point than the sintered powdered metal upper component 26, follows the configuration of conical shoulder 20 and cylindrical surface of the bore 18 to assume a generally tubular shape 32 (FIGURE 3) while the sintered powdered core metal component 26 assumes a cylindrical shape 34 imposed by the tubular shape 32 inside the cylindrical shape of the bore 18.

At the conclusion of the extrusion step, the resulting extruded workpiece 40, shown before its removal from the extrusion press 10 (FIGURE 3) thus has a cylindrical core 34 of higher melting sintered powdered metal, such as iron, topped by an enlarged head 42 of the same material. If the coating layer 32 is of bronze or aluminum, the portions 34 and 42 serve as a higher melting powdered metal core for the tubular hollow cylindrical outer coating layer 32 which is topped by the hollow conical top layer 44 thereof.

Following the extrusion step of the method, the extrusion plunger 12 is retracted upward while the lower ejection plunger 14 is moved upward through the lower bore 18 into the larger diameter bore 16 to eject the extruded headed workpiece 40. In the event that the head 42 is desired to remain on the eventual workpiece, the workpiece 40 remains unchanged except for possible centerless grinding of the external cylindrical and conical surfaces 46 and 48 respectively thereof. If, on the other hand, the presence of the head portion 42 with its conical coating 44 is not desired, the head 42 is cut off, as by sawing or by the use of a cutoff tool while the workpiece is held and rotated in a conventional collet chuck in a lathe, automatic screw machine or similar machine tool.

The resulting headless workpiece 50 shown in FIGURE 4 may be used, for example, as an axle to support a rotating part, such as a gear or pulley. When lubricant is fed to the external surface 46, excellent bearing action is achieved where the external coating layer 32 is bronze. If, on the other hand, the external coating layer 32 is aluminum, it protects the powdered iron or steel core material 34 from rusting if exposed to the weather or otherwise subjected to water or steam, and if of stainless steel, it affords protection from the erosion produced by the flow of high temperature gases, as in the exhaust valves of internal combustion engines.

The coated headed workpiece 52 shown in FIGURE 6 is formed in a similar manner by a similar procedure as that described above, except that a somewhat different proportion of coating metal to core metal is provided in the slug 54 (FIGURE 5) from which the workpiece 52 is produced by extrusion, also a different size of hole therein, as explained below. The workpiece 52, in contrast to the workpiece 40, is provided with a head 56 of considerably larger diameter than the stem core 58. The workpiece 52, when bronze-coated, is well adapted for use as a poppet valve or valve tappet in installations where it is not subjected to the flow of high temperature gases, for example, in a low temperature hydraulic or pneumatic valve assembly. When so coated, the workpiece 52 has its stem 58 and under side of its head 56 protected from rusting by the non-ferrous metal coating 60 on the stem 58 and extended upward in a flared portion 62 beneath the head 56. In this installation it is assumed that the top of the head 56 requires no such protection. On the other hand, where the coating layer 60 is applied for the purpose of imparting better bearing action, such as in the case of bronze coating, the outer surface 64 is accurately ground to fit the guide bore in which the workpiece 52 rotates or reciprocates.

In view of the different distribution and proportion of the metals involved in the workpiece 52 from those in the workpiece 40, the slug 54 has a different proportion and arrangement of its components, although made in the same manner described above in connection with the making of the slug 42 in FIGURES 1 and 2. In the slug 54, the lower melting metal component 66 (FIGURE 5) is in the form of a relatively thin disc with a small hole 68 in the center thereof through which a portion 70 of the higher melting core metal part 72 projects. Since the stem portion 58 of the workpiece 52 in FIGURE 6 is of considerably smaller diameter than the core portion 34 of the workpiece 40 or 50 of FIGURES 3 and 4, a smaller amount of powdered iron or other high melting metal is required for the slug 54. As before, as the extrusion plunger 12 or its equivalent presses downward upon the top surface 74 of the heated slug 54, the higher-melting sintered powdered metal core material 72 pushes its way through the central hole 68 in the slug 54, and spurts downward to form the stem or core portion 58 while the lower melting metal of the ring or perforated disc 66 follows an external path therealong adjacent the bore 18. As the lower-melting bronze portion 66 of the composite slug 54 is pushed downward into the smaller-diameter bore 18, it momentarily forms an internal annular enlargement portion 76 which constricts the core material 72 at 78. This action forms, in effect, an annular "key" which interlocks the two metals 66 and 72 and aids in the "pull"

imparted thereto as they flow downward through the reduced diameter bore 18.

The uncoated headed workpiece, generally designated 80, shown in FIGURE 8 is made in a manner similar to that of the coated headed workpiece 52 of FIGURE 6, except that, as its name indicates, its enlarged head portion 82 and stem 84 are without any coating. As a consequence, the slug 86 from which the workpiece 80 is extruded is homogeneous in that it is composed entirely of the same material throughout. As a consequence, when the slug 86 is dropped into the die cavity 16 and extruded into the lower bore 18 by pressure from the upper plunger 12, the smaller diameter stem 84 is formed, leaving the head portion 82 between the location where the lower end 23 of the upper plunger 12 halted and the upper edge of the frusto-conical shoulder 20. The uncoated headed workpiece 80, when composed of inexpensive material, such as sintered powdered iron, may be used in installations where the workpiece 80 is not exposed to high temperature or corrosive gases or liquids.

The tubular coated and headed workpiece, generally designated 90, shown in FIGURE 11 is formed in a generally similar manner to the solid coated workpiece 40 from a similar composite sintered powdered metal slug 24 as shown in FIGURE 1 and described above, and in a press 92 generally similar to the press 10 of FIGURE 2, hence the same numerals designate similar parts. The press 92 has been slightly modified by the provision of a tubular lower ejector or knockout plunger 94 (FIGURE 10) reciprocable within the bore 18 in the die block 22. Independently reciprocable of the tubular plunger 94 in the central bore 96 thereof is a solid core punch or plunger 98 which on the upper end of its stem 100 is provided with an enlarged head 102 preferably with a conical upper end 104.

In the method of preparing the tubular headed workpiece 90, the tubular knockout or ejector plunger 94 is lowered to a position similar to that of the ejector plunger 14 of FIGURE 2, while the solid core punch or lower inner plunger 98 is raised until the top 104 of its head 102 is positioned approximately just below the level of the lower edge of the frusto-conical surface or shoulder 20 (FIGURE 7). As before, the composite sintered powdered metal slug 24 is heated and then dropped into the die bore 16 where it comes to rest against the shoulder 20. Pressure is then applied to the upper punch or extrusion plunger 12 to cause it to enter the upper end of the die bore 16 and engage the upper surface 30 of the slug 24, forcing it downward past the frusto-conical shoulder 20 into the smaller diameter lower bore 18. At the same time, the central lower end portion of the upper component 26 within the hole 38 is forced downward and spread outward by the pointed top 104 of the head 102 of the core punch 98, displacing the material 26 outward to form a tubular inner stem or shank portion 106.

Meanwhile, the pressure exerted on the upper surface 30 of the slug 24 has also forced the sintered powdered metal lower component 28 downward and inward past the frusto-conical shoulder 20 into the bore 18, causing it to be deposited as an outer coating 108 on the outer surface of the tubular stem or shank portion 106 (FIGURE 11). This action leaves a tapered part 110 at the upper end of the shank portion 106 beneath the enlarged head portion 112 which remains when the descent of the upper punch 12 is terminated a slight distance above the shoulder 20, depending upon the axial thickness desired for the head portion 112. The resulting headed tubular workpiece 90 shown in FIGURE 11 thus has a coated tubular shank, generally designated 114, topped by a coated enlarged head portion 116. If this is to be used for a tubular shaft, such as for a hollow idler shaft, or for a plunger, the outer surface 118 of the coated shank 114 is preferably ground to accurately cylindrical shape and of the precise diameter desired. The head 116 may be left on the workpiece 90 if desired, or cut off in a manner analogous to that shown in FIGURE 4 with respect to the headless workpiece 50.

The top-coated headed composite workpiece, generally designated 120, shown in FIGURE 14, is employed in installations where the top surface 122 of the head 124 is exposed to high temperature or corrosive gases or liquids or otherwise requires protection, which the lower smaller diameter stem 126 does not require. To that end, the composite workpiece 120 consists of a high-temperature-resistant upper part 128 consisting of an enlargement 130 and a smaller diameter extension 132 projecting downward into the interior of the stem 126. This upper part 128 conveniently consists of sintered powdered stainless steel, whereas the lower part or stem 126 may consist of sintered powdered iron or carbon steel with a reduced-diameter lower portion 133 constituting the major part of the stem 126 and with an outwardly-extending upper portion 135 beneath the head 124.

The composite workpiece 120 of FIGURE 14 is produced by extrusion of the composite slug 134 of FIGURE 12. The latter consists of an upper part 136 of heat- or corrosion-resistant material, such as sintered powdered stainless steel, and a lower part 138 provided with a downwardly-projecting central boss 139 and consisting of a baser material, such as sintered powdered iron or carbon steel. The composite sintered powdered metal slug 134 is prepared by first depositing a lower layer of the powdered baser material in the die cavity of a conventional briquetting press, then depositing thereon an upper layer of the powdered resistant material, and finally pressing the two layers together to form a composite briquette. The composite briquette thus formed is sintered in a conventional sintering oven to form the composite slug 134.

The composite slug 134 is then heated and extruded in an extrusion press, generally designated 140 (FIGURE 13) generally similar to the press 10 of FIGURES 2 and 3, FIGURE 13 shows the press 140 as possessing an upper punch or plunger 142, and a lower punch or plunger 144 which also serves as an ejection or knockout plunger, the plungers 142 and 144 being reciprocable in upper and lower bores 146 and 148 respectively of different diameters joined to one another by an annular shoulder 150 within a die block 152. The shoulder 150 is slightly different in configuration from the frusto-conical shoulder 20 of FIGURES 2 and 3 in that it possesses outer and inner tapered surfaces 154 and 156 joined to one another by an approximately radial surface 158. It will be understood, however, that the configuration of the annular shoulder 150 depends on the shape it is desired to impart to the lower side of the head 124 of the workpiece 120.

The lower plunger 144 has an enlarged flange 160 at which it is connected to a barrel 162 terminating at its lower end in a piston head 164. The latter is reciprocable in a cylinder bore 166 within a cylinder 168 which may form a part of the bed of the press 140 (not shown). Fluid is conducted into and out of the cylinder bore 166 through a bottom port 170, whereas a side port 172 is connected to a pressure gauge (not shown) to indicate to the press operator the pressure existing at any instant within the cylinder bore 166 as a result of pressure fluid supplied thereto from a conventional hydraulic pump circuit (not shown) through the port 170. The cylinder 168 and piston head 164 thus constitute a single-acting hydraulic motor 174.

In the production of the workpiece 120, the composite sintered powdered metal slug 134 is first heated and then dropped into the upper bore or die cavity 146 with its projecting boss 139 projecting downward. Pressure is then applied to the upper plunger or punch 142 to force it and the composite sintered powdered metal slug 134 downward through the die cavity of upper bore 146 into the lower bore 148 by way of the annular shoulder 150 (FIGURE 14). This action causes the baser sintered powdered metal part 138, such as powdered iron, to flow ahead of the heat-resistant sintered powdered metal upper part 136 to form the major part 133 of the stem 126 but at the same time the outer portions of the upper part 136 flow downward while the central part 132 thereof (FIGURE 14) proceeds downward within the stem 126, leaving the upper portion 135 of the baser metal beneath the enlarged equidistant metal portion 130. The workpiece 134 is ejected by admitting pressure fluid through the port 170 into the cylinder bore 166 to raise the piston head 164 while the upper punch or plunger 142 is retracted upward.

The top-protected headed member, generally designated 180 (FIGURE 19) consists of an inner component 182 composed of a baser metal such as sintered powdered iron, and an upper protective coating 184 surrounding the upper portion of the inner component 182, namely the head 186 and upper portion of the stem 188 thereof. For this purpose, a composite slug 190 (FIGURE 17) is prepared consisting of separately-briquetted and sintered inner and outer components 192 and 194 respectively (FIGURES 15 and 16). The inner portion 192 is conveniently made of a baser metal, such as sintered powdered iron, and the outer cup-shaped portion 194 of a heat- or corrosion-resisting metal, such as sintered powdered stainless steel. These are separately prepared in a manner described above in connection with the preparation of the composite slug 24 of FIGURE 1 and then assembled as by pressing to produce the composite slug 190. The cup-shaped outer component 194 may be beveled as at 196 to control the depth to which the side portion 198 will flow relatively to the top portion 200 (FIGURE 16). The inner component 192 on the other hand may have a downwardly-projecting boss 202 to facilitate flow thereof down the reduced diameter bore 148 in the die block 152. The same extrusion press 140 shown in FIGURE 13 may be employed for extruding the composite slug 190, hence similar parts are designated with the same reference numerals.

In the preparation of the top-protected workpiece 180, the composite slug 190 after heating is dropped into the upper or die bore 146 as before, and the upper plunger 142 causes to descend from the position of FIGURE 18 to that of FIGURE 19. At the same time, the lower plunger 144 yields in a downward direction from the position of FIGURE 18 to that of FIGURE 19, as the core metal or inner portion 192 flows downward. At the same time, the side wall portion 198 of the outer component flows down and around the upper enlargement 186 of the baser metal stem portion 188 and forms a peripheral portion 204 (FIGURE 19), a radial portion 206 beneath the enlargement 186 and a stem protective axial portion 208 which extends downward along the upper portion and outside the based metal stem portion 188. The workpiece 180 thus has the composite head 210 and the upper portion of the stem 188 completely protected against hot or corrosive gases or liquids while the lower part of the stem 188 is left unprotected as not requiring such protection.

FIGURES 20 to 27 inclusive illustrate how the location and amount of heat-resistant or protective metal may be varied relatively to the baser metal by varying the amount and location of the protective metal relatively to the baser metal in the composite slug, using the same extrusion press 140 and substantially the same method as described above. The composite slug 212 of FIGURE 20 has a cylindrical central portion or core 214 of baser metal, such as sintered powdered iron, and a tubular outer portion 216 of hollow cylindrical shape, preferably formed of sintered powdered stainless steel, and prepared in the same manner as the composite slug 190 of FIGURE 17. When extruded in a manner similar to that shown in FIGURES 18 and 19, the composite slug 212 produces a workpiece 218 (FIGURE 21) with a stem 220 and a head 222, both of baser metal such as sintered powdered iron or steel, protected only at the periphery by an annular portion 224 of sintered powdered stainless steel or the like which extends underneath the head 222 in a portion 226 while having a circumferential part 228 protecting the outer edge of the head 222.

The composite slug 230 of FIGURE 22 has a flanged cylindrical central portion or core 232 of baser metal, such as sintered powdered iron or steel. Beneath the flange 234 is placed a tubular part 236 of heat or corrosion-protecting metal, such as sintered powdered stainless steel. The composite slug 230 is prepared in the manner described above in the preparation of the composite slug 190 of FIGURE 17. When extruded in a manner similar to that shown in FIGURE 19 in the extrusion press 140, the composite slug 230 becomes the headed workpiece 238 of FIGURE 23 with a headed central portion 240 consisting of a head 242 and stem 244 of baser metal, with the head 242 protected solely on its under periphery by an annular portion 246 of the protective metal, such as stainless steel.

FIGURES 24 to 27 inclusive illustrate how a rim-protected headed workpiece 250 (FIGURE 27) is produced from a composite sintered powdered metal slug 252 of FIGURE 26. The composite slug 252 is produced in the manner shown in FIGURES 24 and 25 with the baser metal portion 254 and the annular upper peripheral protective portion 256 produced simultaneously. For this purpose, a conventional briquetting press 260 shown in FIGURE 24 is used. This consists of a die block 262 with a cylindrical die cavity or bore 264 within which a lower punch or plunger 266 reciprocates. The top 268 of the lower plunger 266 closes the bottom of the die bore 264 to form the die cavity. Into the die bore 264 of FIGURE 24 is poured a charge 270 of baser powdered metal, such as powdered iron or steel, up to the level 272. A separation tube or sleeve 274 is then placed temporarily on top of the charge 270 at the level 272 and filling continued. More of the powdered baser metal is poured into the tubular separator 274 up to approximately the level of the top surface 276 of the die block 262. The remainder of the space between the outside of the tubular separator 274 and the die bore 260 is then filled with an annular charge 278 of protective metal, such as powdered stainless steel up to the level of the top surface 276 of the die block 262. Thereupon the tubular separator 274 is lifted out of the die bore 264 and removed, whereupon the particles of the protective metal charge 278 and baser metal charge 270 readjust themselves until the annular protective metal charge 278 surrounds the upwardly-projecting central portion 280 of the charge 270.

The upper plunger or punch 282 of the press 260 is then lowered in the manner shown in FIGURE 25 and caused to enter and move downward in the die bore 264, compressing the composite powdered metal charge, generally designated 284, between the lower end surface 286 of the upper plunger 282 and the top surface 268 of the lower plunger 266. The resulting briquette is then sintered in a conventional sintering oven by conventional sintering methods to produce the composite sintered powdered metal slug 252 described above. The slug 252 is then heated and dropped into the die bore 146 of the extrusion press 140 of FIGURE 18 and extrusion carried out in the foregoing manner. During extrusion, the major part of the baser sintered powdered metal portion 254 flows downward to produce the stem 288, whereas the minor portion remains to form the head 290. The annular protective component 256, in contrast, remains substantially in its starting position to produce the annular rim 292 surrounding the head 290 on the stem 288, constituting the inner and otherwise unprotected component 294.

I claim:

1. An extrusion method of making a composite sintered powdered metal article, comprising preparing a briquette of powdered core metal,
preparing a briquette of powdered coating metal,
sintering said briquettes,
joining said briquettes to one another to form a composite sintered powdered metal extrusion slug,
heating the slug to a temperature sufficient to soften the metal thereof,
and forcing the heated slug through an extrusion opening of smaller diameter than the slug whereby the core metal and coating metal move through the opening in overlying relationship to one another and form a composite workpiece.

2. A method, according to claim 1, wherein the coating metal in the slug is disposed in an annular zone around the core metal.

3. A method, according to claim 1, wherein the coating metal in the slug is disposed forwardly of the major part of the core metal during extrusion.

4. A method, according to claim 3, wherein the coating material in the slug has an aperture therein, and wherein the core metal extends through said aperture.

5. A method, according to claim 1, wherein the extrusion is terminated while a portion of the slug remains rearwardly of the extrusion opening to form a head on the workpiece, and wherein the workpiece is ejected from the extrusion opening with said head thereon.

6. A method, according to claim 5, including the step of severing said head from the remainder of the workpiece following its ejection.

7. A method, according to claim 5, including the step of positioning a punch of lesser diameter than the extrusion opening adjacent said opening and forcing the metal around said punch during extrusion whereby to form a hollow in the workpiece.

8. A method, according to claim 1, wherein the coating metal in the slug is disposed rearwardly of the major part of the core metal during extrusion.

9. A method, according to claim 1, wherein the coating metal is corrosion-resistant and heat-resistant metal.

10. A method, according to claim 5, wherein the coating metal is disposed in cup-shaped form around the core metal in the slug.

11. A method, according to claim 10, wherein the core metal faces the extrusion opening during extrusion.

12. A method, according to claim 11, wherein the coating metal is corrosion-resistant and heat-resistant metal.

13. A method, according to claim 5, wherein the coating metal is disposed in tubular form encircling the core metal in the slug.

14. A method, according to claim 13, wherein the core metal extends outwardly over one end of the tubular coating metal in the slug.

15. An extrusion method of making a composite sintered powdered metal article comprising
preparing a composite briquette consisting of a portion of powdered core metal and a portion of powdered coating metal,
sintering said composite briquette to form a composite sintered powdered metal extrusion slug,
heating the slug to a temperature sufficient to soften the metal thereof,
and forcing the heated slug through an extrusion opening of smaller diameter than the slug whereby the core metal and coating metal move through the opening in overlying relationship to one another and form a composite workpiece.

16. A method, according to claim 15, wherein the core metal powder is deposited in a briquetting press die cavity, wherein a separator is then placed upon the top of the core metal powder, and wherein the coating metal powder is then deposited on top of the core metal powder and prevented by said separator from spreading laterally therebeyond.

References Cited
UNITED STATES PATENTS 2,819,163    1/1958    Balke _____ 75—208
3,168,399    2/1965    Takahashi _____ 75—208

L. DEWAYNE RUTLEDGE, *Primary Examiner.*

A. J. STEINER, *Assistant Examiner.*